United States Patent
Bae

(10) Patent No.: US 8,938,082 B2
(45) Date of Patent: Jan. 20, 2015

(54) APPARATUS HAVING HEARING AID

(75) Inventor: Ju-Yeol Bae, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 695 days.

(21) Appl. No.: 12/592,349

(22) Filed: Nov. 24, 2009

(65) Prior Publication Data

US 2010/0128909 A1 May 27, 2010

(30) Foreign Application Priority Data

Nov. 27, 2008 (KR) .................. 10-2008-0119179

(51) Int. Cl.
- H04R 25/00 (2006.01)
- H04M 1/00 (2006.01)
- G01C 9/06 (2006.01)
- G01C 17/30 (2006.01)
- H04M 1/60 (2006.01)
- H04M 1/725 (2006.01)

(52) U.S. Cl.
CPC ........ *H04R 25/00* (2013.01); *G01C 9/06* (2013.01); *G01C 17/30* (2013.01); *H04M 1/60* (2013.01); *H04M 1/72591* (2013.01); *H04M 2250/22* (2013.01)
USPC .................. 381/315; 381/317; 455/569.1

(58) Field of Classification Search
USPC .................. 381/314, 315, 312, 317, 318; 455/556.1, 556.2, 569.1, 570
See application file for complete search history.

(56) References Cited

U.S. PATENT DOCUMENTS

| | | | | |
|---|---|---|---|---|
| 6,411,828 | B1 * | 6/2002 | Lands et al. | 455/569.1 |
| 7,711,316 | B2 * | 5/2010 | Bae | 455/3.06 |
| 8,077,891 | B2 * | 12/2011 | Hasler et al. | 381/315 |
| 8,099,124 | B2 * | 1/2012 | Tilley | 455/550.1 |
| 2007/0269065 | A1 * | 11/2007 | Kilsgaard | 381/315 |
| 2009/0074216 | A1 * | 3/2009 | Bradford et al. | 381/315 |

FOREIGN PATENT DOCUMENTS

| | | |
|---|---|---|
| KR | 10-2005-0120098 A | 12/2005 |
| KR | 10-2006-0057408 A | 5/2006 |

OTHER PUBLICATIONS

Notice of Preliminary Rejection dated Aug. 22, 2014 in connection with Korean Patent Application No. 10-2008-0119179; 8pages.

* cited by examiner

*Primary Examiner* — Davetta W Goins
*Assistant Examiner* — Phylesha Dabney

(57) ABSTRACT

A portable terminal includes an apparatus capable of providing a hearing aid service. The apparatus includes a sensor configured to measure a spatial tilt of the portable terminal. The apparatus also includes a controller that determines whether a left ear or a right ear is used for communication based on the measured spatial tilt of the portable terminal. An audio signal processor compensates an audio signal according to the characteristic of determined ear.

15 Claims, 2 Drawing Sheets

APPARATUS HAVING HEARING AID

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Nov. 27, 2008 and assigned Ser. No. 10-2008-0119179, the entire disclosure of which is hereby incorporated by reference.

TECHNICAL FIELD OF THE INVENTION

The present invention relates to an apparatus having a hearing aid in a portable terminal for compensating a sound (voice) quality over a call. More particularly, the present invention relates to the apparatus that includes a hearing aid in the portable terminal for compensating the sound (voice) quality over a call conforming to hearing characteristics of a left ear and a right ear of a user.

BACKGROUND OF THE INVENTION

When the user uses a communication portable terminal, the sound (voice) quality of the communication terminal is very important. Herein, the communication portable terminal can be either a wire communication terminal or a wireless communication terminal.

The communication portable terminal compensates sound signals in an effective frequency band using an equalization technology according to the hearing characteristics of the user to improve a sound (such as a voice) quality performance.

However, in a conventional technology, compensation of the sound signals in the communication portable terminal does not consider the hearing characteristics of the left ear or the right ear of a user.

The user of the communication portable terminal has unique hearing characteristics according to the left ear or the right ear of a user.

Therefore, there is a need to provide a communication portable terminal to compensate sound (voice) signals according to the hearing characteristics of the left ear or the right ear of the user.

SUMMARY OF THE INVENTION

To address the above-discussed deficiencies of the conventional art, it is a primary aspect of the present invention is to address at least the above mentioned problems and/or disadvantages and to provide at least the advantages described below.

Accordingly, an aspect of the present invention is to provide an apparatus for determining which ear is used for communication for improving the sound (voice) signals in a portable terminal.

Another aspect of the present invention is to provide a method for determining which ear is used for communication for improving the sound (voice) signals in a portable terminal.

According to one aspect of the present invention, a portable terminal that provides a hearing aid service includes a sensor that measures a spatial tilt of the portable terminal, a controller that determines whether a left or a right ear is used for communication based on the measured spatial tilt of the portable terminal, and an audio signal processor that compensates an audio signal according to the characteristic of determined ear.

According to another aspect of the present invention, a method for providing a hearing aid service in a portable terminal includes measuring a spatial tilt of the portable terminal, determining whether a left or a right ear is used for communication based on the measured spatial tilt of the portable terminal, and compensating an audio signal according to the characteristic of determined ear.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1C:
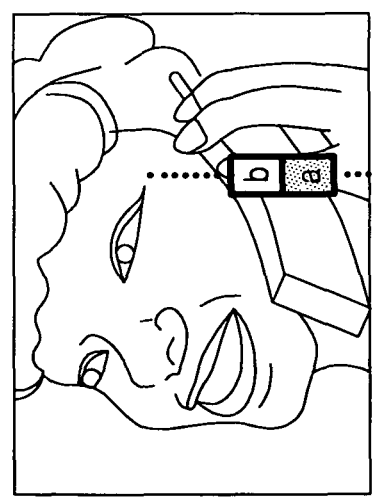
FIGS. 1A through 1C illustrate an ear which a user uses in a communication according to an exemplary embodiment of the present invention.
Figure 1B:
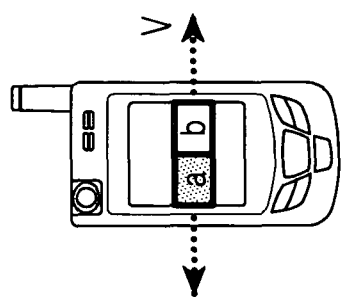
Figure 1A:
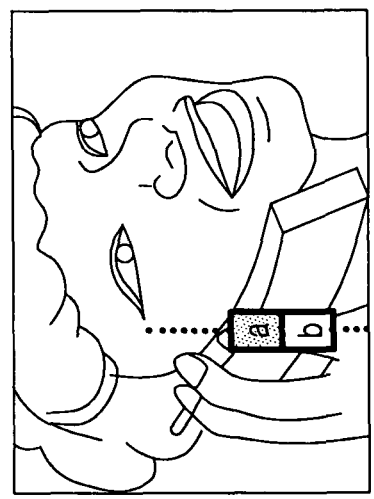
Figure 2:
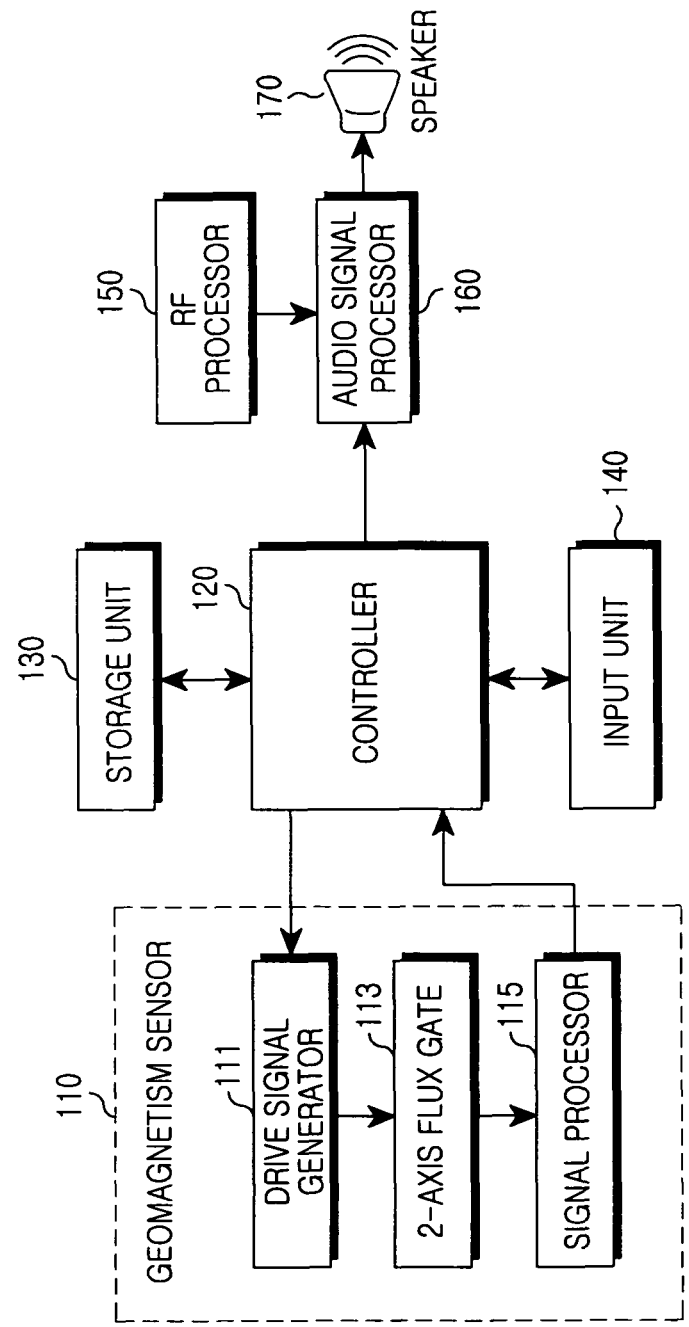
FIG. 2 illustrates a functional block diagram of a portable terminal according to an exemplary embodiment of the present invention.

FIGS. 1A through 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for compensating a sound (such as a voice) sound quality according to a hearing characteristic of ear that user uses for sound (voice).

FIGS. 1A through 1C illustrate an ear that a user uses in a communication according to an exemplary embodiment of the present invention.

FIG. 1A illustrates a portable terminal that is used with a left ear. FIG. 1B illustrates a portable terminal that determines which ear the user receives sound (voice) signals. FIG. 1C illustrates a portable terminal that is used with a right ear.

The portable terminal determines which ear is used in communication with the portable terminal using a portable terminal tilt.

For example, measuring of tilting of a straight line between a speaker and a microphone in the portable terminal determines which ear is used in communication with the portable terminal. That is, the location of the position of the portable terminal is used to determining the use of ear by the user.

If <b> is higher than <a> as illustrated in Fig. A, it is determined that the left ear is used for the portable terminal communication. Also, if <a> is higher than <b> as illustrated in Fig. C, it is determined that the right ear is used for the portable terminal communication.

Here, the portable terminal measures tilting of the portable terminal, that is tilting of the straight line between the speaker and the microphone in the portable terminal is measured using a geomagnetism sensor or a gradient sensor.

There are many other ways to identify of the position of the portable terminal with respect to the use of the ears of the user.

FIG. 2 illustrates a functional block diagram of a portable terminal according to an exemplary embodiment of the present invention.

The portable terminal of FIG. 2 includes a Geomagnetism sensor 110, a controller 120, a storage unit 130, an input unit 140, a RF (Radio Frequency) processor 150, an audio signal processor 160 and a speaker 170.

The Geomagnetism sensor 110 measures spatial tilt of the portable terminal.

For example, the Geomagnetism sensor 110 measures a tilting of a reference line that is orthogonal to a straight line between the speaker 170 and a microphone (not shown). The measured tilting of the reference line is spatial tilt of the portable terminal. Here, the microphone is positioned to make a center line between the top portion and the bottom portion of the portable terminal.

For another example, the Geomagnetism sensor 110 measures earth magnetism of observation point and measures tilting direction (position) of corresponding point using the measured earth magnetism.

The Geomagnetism sensor 110 in the portable terminal includes a drive signal generator 111, a 2-axis flux gate 113 and a signal processor 115.

The drive signal generator 111 includes a drive pulse generation circuit and a current amplification circuit for driving a coil.

The drive pulse generation circuit generates a drive pulse that drives the 2-axis flux gate 113.

The drive pulse generation switches the drive pulse selectively.

Thereafter, the drive pulse generation circuit transmits the switched drive pulse to the current amplification circuit.

The current amplification circuit includes a plurality of amplifiers and phase reversers. The current amplification circuit generates a pulse signal and a reverse pulse signal using the drive pulse output from the drive pulse generation circuit. Herein, the phase of the pulse signal and the reverse pulse signal is opposite.

The 2-axis flux gate 113 drives an X-axis flux gate and a Y-axis flux gate using the pulse signal and the reverse pulse signal.

The 2-axis flux gate 113 detects an electrical signal that corresponds to an electromotive force which is generated by X-axis flux gate and a Y-axis flux gate.

The signal processor 115 includes a chopping circuit, a first amplifier, a low frequency filter, a second amplifier and an ADC (Analog/Digital Converter).

The chopping circuit chops the electrical signal output from the 2-axis flux gate 113 using a plurality of switches.

The switches in the chopping circuit are controlled by the electrical signal output from the 2-axis flux gate 113.

The first amplifier differentially amplifies the electrical signal output from the chopping circuit.

The low frequency filter filters the amplified signal in a predetermined band.

The second amplifier amplifies the filtered signal to create final signals.

The ADC converts the amplified signal in the second amplifier to digital voltage values.

Then, the controller 120 determines which ear is used in the portable terminal communication based on the tilting of the portable terminal as measured by the Geomagnetism sensor 110.

The storage unit 130 stores a profile data. Herein, the profile data includes hearing characteristics of the left ear and the right ear of the user.

The input unit 140 provides profile data corresponding to input of the user to the controller 120.

The RF processor 150 converts the RF signal received via an antenna to a baseband signal.

The audio signal processor 160 decodes the baseband signal output from the RF processor 150 and extracts an audio signal. Since, the audio signal processor 160 transmits the extracted audio signal to the speaker 170.

As described above, the controller 120 determines position of the portable terminal with respect to ears of the user. In other words, the controller 120 determines which ear is used for the portable terminal communication by the user.

Since, the controller 120 controls the audio signal processor 160 to compensate audio signals according the stored profile data in the storage unit 130. At this point, the audio signal processor 160 compensates the audio signals according to the stored profile data of the user in the storage unit 130 and transmits the compensated audio signals to the speaker 170.

As described above, the portable terminal compensates sound (voice) signals according to the hearing characteristic of the ear being used in communication, and therefore it provides an improved portable terminal for communication.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A portable terminal configured to provide a hearing aid service, the portable terminal comprising:

a sensor configured to measure a spatial tilt of the portable terminal;

a controller configured to determine one of a left ear and a right ear that is used for communication based on the measured spatial tilt of the portable terminal;

a storage unit configured to store audiology data of the left ear and the right ear; and an audio signal processor configured to compensate an audio signal according to the audiology data of the determined ear stored in the storage unit, wherein the sensor measures the spatial tilt of the portable terminal by using a straight line between a speaker and a microphone of the portable terminal as a reference line.

2. The portable terminal of claim 1, wherein the sensor includes at least one of a geomagnetism sensor and a gradient sensor.

3. The portable terminal of claim 1, wherein the sensor comprises:

a drive signal generator configured to generate a drive signal;

a 2-axis flux gate configured to detect an electrical signal corresponding to an electromotive force generated by the drive signal; and a signal processor configured to filter the electrical signal and output the filtered signal.

4. The portable terminal of claim 1, wherein the characteristic audiology data of the left ear and the right ear is stored as profile data corresponding to an operator of the portable terminal.

5. The portable terminal of claim 4, further comprising an input unit configured to enable the operator of the portable terminal to input the profile data.

6. A method for providing a hearing aid service in a portable terminal, the method comprising:

measuring a spatial tilt of the portable terminal by using a straight line between a speaker and a microphone as a reference line;

determining one of a left ear and a right ear that is used for communication based on the measured spatial tilt of the portable terminal; and compensating an audio signal according to an audiology data of the determined ear stored in a storage unit in the portable terminal.

7. The method of claim 6, wherein the measuring of the spatial tilt of the portable terminal is determined by at least one of a geomagnetism sensor and a gradient sensor.

8. The method of claim 6, further comprising:

generating a drive signal using a drive signal generator;

detecting, using a 2-axis flux gate, an electrical signal corresponding to an electromotive force generated by the drive signal; and filtering, using a signal processor, the electrical signal and output the filtered signal.

9. The method of claim 6, wherein the audiology data of the left ear and the right ear is stored as profile data corresponding to an operator of the portable terminal.

10. The method of claim 9, further comprising receiving, via an input unit, the profile data.

11. An apparatus configured for use in a portable terminal that is configured to provide a hearing aid service, the apparatus comprising:

a sensor configured to measure a spatial tilt of the portable terminal;

a controller configured to determine one of a left ear and a right ear that is used for communication based on the measured spatial tilt of the portable terminal;

a storage unit configured to store audiology data of the left ear and the right ear; and an audio signal processor configured to compensate an audio signal according to the audiology data of the determined ear stored in the storage unit, wherein the sensor measures the spatial tilt of the portable terminal by using a straight line between a speaker and a microphone of the portable terminal as a reference line.

12. The apparatus of claim 11, wherein the sensor includes at least one of a geomagnetism sensor and a gradient sensor.

13. The apparatus of claim 11, wherein the sensor comprises:

a drive signal generator configured to generate a drive signal;

a 2-axis flux gate configured to detect an electrical signal corresponding to an electromotive force generated by the drive signal; and a signal processor configured to filter the electrical signal and output the filtered signal.

14. The apparatus of claim 11, wherein the audiology data of the left ear and the right ear is stored as profile data corresponding to an operator of the portable terminal.

15. The apparatus of claim 14, further comprising an input unit configured to enable the operator of the portable terminal to input the profile data.

* * * * *